(12) United States Patent
Gao et al.

(10) Patent No.: US 10,293,664 B2
(45) Date of Patent: May 21, 2019

(54) VEHICLE ENVIRONMENT IMAGING SYSTEMS AND METHODS

(71) Applicant: GM GLOBAL TECHNOLOGY OPERATIONS LLC, Detroit, MI (US)

(72) Inventors: Xiujie Gao, Troy, MI (US); Jinsong Wang, Troy, MI (US); Wende Zhang, Troy, MI (US); Xinhua Xiao, Madison Heights, MI (US); Jie Yin, Rochester, MI (US); Donald K. Grimm, Utica, MI (US); Jeffrey A. Bozeman, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 15/434,649

(22) Filed: Feb. 16, 2017

(65) Prior Publication Data
US 2018/0229587 A1 Aug. 16, 2018

(51) Int. Cl.
*B60H 1/00* (2006.01)
*E05F 15/73* (2015.01)
(Continued)

(52) U.S. Cl.
CPC .............. *B60J 1/12* (2013.01); *B60H 1/0075* (2013.01); *B60H 1/00778* (2013.01); *B60H 1/00821* (2013.01); *B60H 1/00978* (2013.01); *E05F 15/71* (2015.01); *E05F 15/73* (2015.01); *G01K 13/00* (2013.01); *E05F 2015/767* (2015.01); *E05Y 2400/44* (2013.01);
(Continued)

(58) Field of Classification Search
CPC ........... E05Y 2900/55; E05Y 2400/358; E05Y 2400/356; E05Y 2400/45; E05Y 2400/52; E05Y 2400/854; E05Y 2400/86; E05Y 2800/00; E05Y 2400/254; B60H 1/00735; B60H 1/00742; B60H 1/00771; B60H 1/00785; B60H 1/00814; G01S 7/52006; G01S 7/5205
USPC ......................................................... 701/49
See application file for complete search history.

(56) References Cited

U.S. PATENT DOCUMENTS 4,852,469 A   8/1989 Chuang
5,293,105 A   3/1994 West, Jr.
(Continued)

OTHER PUBLICATIONS

Sabra Chartrand, New York Times News Service, "Sensor Will Automatically Roll Up Car's Window at First Hint of Rain", Published May 8, 1994; 2 pages.

*Primary Examiner* — Charles J Han
(74) *Attorney, Agent, or Firm* — Quinn IP Law

(57) ABSTRACT

A vehicle includes a vision system configured to output a signal indicative of exterior conditions in a vicinity of the vehicle and a temperature sensor configured to output a signal indicative of an interior temperature of the vehicle. The vehicle also includes a plurality of articulable openings arranged to allow fluid flow communication between an interior and an exterior of the vehicle. The vehicle further includes a controller programmed to adjust at least one articulable opening toward an open position in response to the interior temperature exceeding a temperature threshold. The controller is also programmed to adjust at least one articulable opening toward a closed position in response to detection via the vision system of a threat condition in the vicinity of the vehicle.

16 Claims, 3 Drawing Sheets

(51) Int. Cl.
*E05F 15/71* (2015.01)
*G01K 13/00* (2006.01)
*B60J 1/12* (2006.01)

(52) U.S. Cl.
CPC ..... *E05Y 2400/45* (2013.01); *E05Y 2400/525* (2013.01); *E05Y 2900/55* (2013.01)

(56) References Cited

U.S. PATENT DOCUMENTS

| | | |
|---|---|---|
| 6,922,622 B2 | 7/2005 | Dulin et al. |
| 8,827,027 B2 | 9/2014 | Syvret et al. |
| 2007/0189728 A1 | 8/2007 | Yu |
| 2008/0133136 A1 | 6/2008 | Breed et al. |
| 2010/0332086 A1 | 12/2010 | Zhao |
| 2013/0086111 A1 | 4/2013 | Schoettle |
| 2014/0180959 A1 | 6/2014 | Gillen et al. |
| 2016/0119539 A1 | 4/2016 | Tan |
| 2016/0347149 A1* | 12/2016 | Rustoni .............. B60H 1/00771 |
| 2017/0113512 A1* | 4/2017 | Park .................. B60H 1/00849 |
| 2017/0120803 A1 | 5/2017 | Kentley et al. |
| 2018/0201227 A1 | 7/2018 | Gao et al. |

\* cited by examiner

VEHICLE ENVIRONMENT IMAGING SYSTEMS AND METHODS

TECHNICAL FIELD

The present disclosure relates to vehicle imaging systems and methods for providing vehicle thermal management.

INTRODUCTION

Vehicles encounter situations and locations which carry various levels of risk due to crime, traffic, weather, and other variables of the external environment of the vehicle. For example, passengers may perform tasks which can serve as a distraction such that a passenger is less aware of the vehicle surroundings. During such situations, passengers, even when fully alert, may be unaware of increased risks and therefore not perceive nearby actual threats. Staying fully aware of the vehicle surroundings in addition to considering varying risk in a given situation may be difficult for a passenger to do on a consistent basis, particularly when performing unrelated tasks. Additionally, when a user is away from the vehicle it is common to fully close all openings of the vehicle to enhance security. A closed state may allow the vehicle to accumulate heat such that the internal temperature is increased beyond passenger comfort levels.

SUMMARY

A vehicle includes a vision system configured to output a signal indicative of exterior conditions in a vicinity of the vehicle and a temperature sensor configured to output a signal indicative of an interior temperature of the vehicle. The vehicle also includes a plurality of articulable openings arranged to allow fluid flow communication between an interior and an exterior of the vehicle. The vehicle further includes a controller programmed to adjust at least one articulable opening toward an open position in response to the interior temperature exceeding a temperature threshold. The controller is also programmed to adjust at least one articulable opening toward a closed position in response to detection via the vision system of a threat condition in the vicinity of the vehicle.

A method of regulating temperature of a passenger cabin of a vehicle includes measuring a current passenger cabin temperature and adjusting at least one vehicle opening toward an open position in response to the passenger cabin temperature exceeding a temperature threshold. The method also includes detecting an object in a vicinity of the vehicle and adjusting at least one vehicle opening toward a closed position based on a threat assessment of the object detected in the vicinity.

A vehicle compartment thermal management system includes a temperature sensor to detect a temperature in the compartment and at least one powered opening defining a range of open positions to allow fluid flow communication between the compartment and an exterior of the vehicle. The thermal management system also includes a vision system to detect objects at the exterior of the vehicle. A thermal management system controller is programmed to increase an opening magnitude of at least one powered opening in response to the temperature exceeding a temperature threshold, and to decrease an opening magnitude of at least one powered opening in response to detection via the vision system of an object within a distance threshold of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
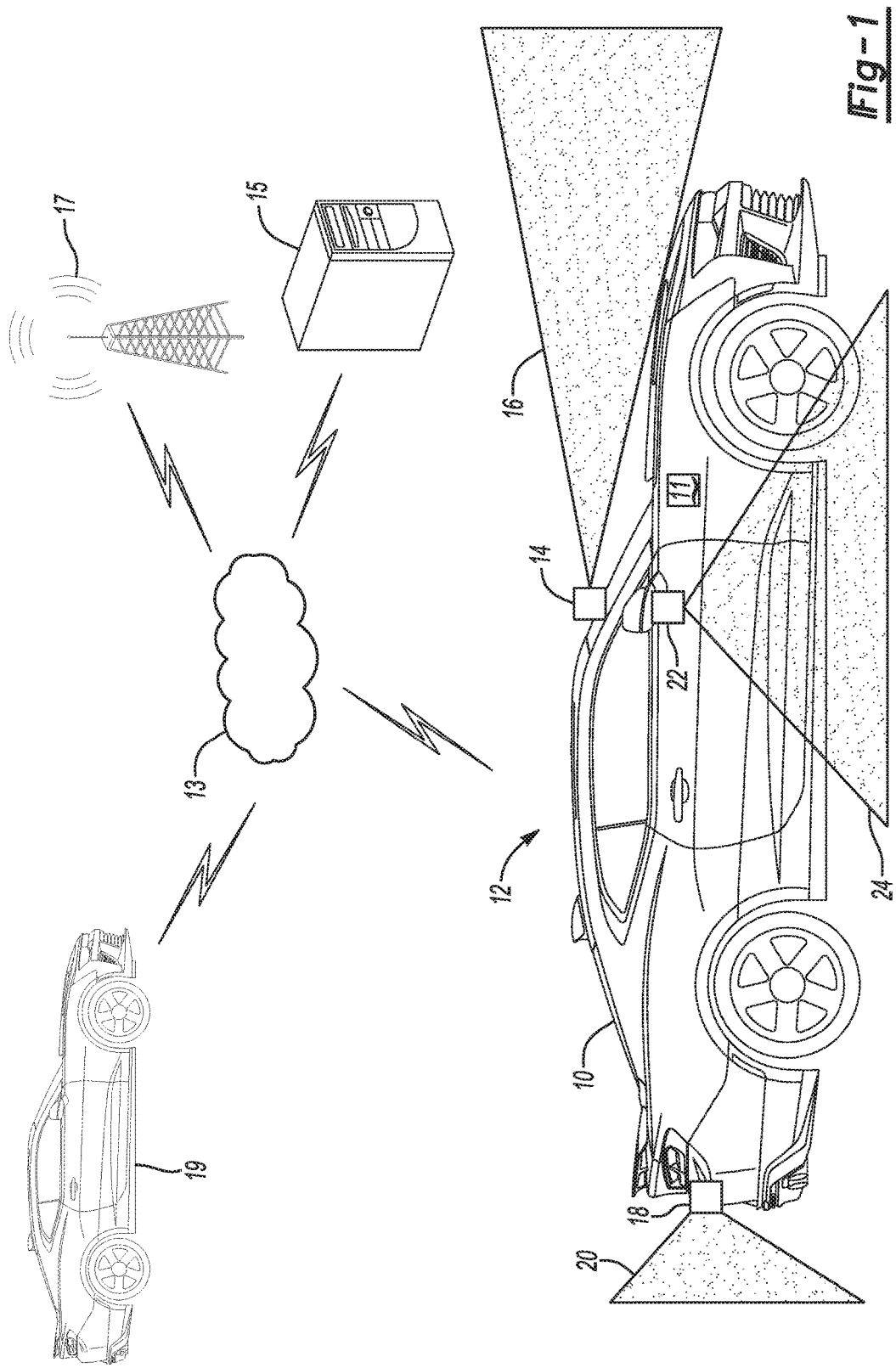
FIG. 1 is a schematic side view of a vehicle having a vision system.

Referring to FIG. 1, a vehicle 10 includes a vision system 12 configured to capture images in a plurality of regions surrounding the vehicle, including, but not limited to, images in a forward-facing direction, a rearward-facing direction, and/or or images in lateral-facing directions. The vision system 12 includes at least one vision-based imaging device to captures images corresponding to the exterior of the vehicle 10 for detecting the vehicle surroundings. Each of the vision-based imaging devices is mounted on the vehicle so that images in the desired region of the vehicle vicinity are captured.

A first vision-based imaging device 14 is mounted behind the front windshield for capturing images representing the vehicle's vicinity in an exterior forward direction. In the example of FIG. 1, the first vision-based imaging device 14 is a front-view camera for capturing a forward field-of-view (FOV) 16 of the vehicle 10. In additional examples, an imaging device may be disposed near a vehicle grill, a front fascia, or other location closer to the forward edged of the vehicle. A second vision-based imaging device 18 is mounted at a rear portion of the vehicle to capture images representing the vehicle's vicinity in an exterior rearward direction. According to an example, the second vision-based imaging device 18 is a rear-view camera for capturing a rearward FOV 20 of the vehicle. A third vision-based imaging device 22 is mounted at a side portion of the vehicle to capture images representing the vehicle's vicinity in an exterior lateral direction. According to an example, the third vision-based imaging device 22 is a side-view camera for capturing a lateral FOV 24 of the vehicle. In a more specific example, a side-view camera is mounted on each of opposing sides of the vehicle 10 (e.g. a left side-view camera and a right side-view camera). It should be appreciated that while various FOV's are depicted in the Figures as having certain geometric patterns, actual FOV's may have any number of different geometries according to the type of imaging device which is employed in practice. In some examples, wide angle imaging devices are used to provide wide angle FOV's such as 180 degrees and wider. Additionally, while each of the cameras is depicted as being mounted on the vehicle, alternate examples include external cameras having FOV's which capture the surrounding environment of the vehicle.

The cameras 14, 18, and 22 can be any type of imaging device suitable for the purposes described herein, that are capable of receiving light, or other radiation, and converting the light energy to electrical signals in a pixel format using, for example, charged coupled devices (CCD). Each of the cameras may also be operable to capture images in various regions of the electromagnetic spectrum, including infrared, ultraviolet, or within visible light. The cameras may also be operable to capture digital images and/or video data in any suitable resolution including high-definition. As used in the present disclosure, image data provided by the image capture devices includes either individual images or a stream of video images. The cameras may be any digital video recording device in communication with a processing unit of the vehicle. Image data acquired by the cameras is passed to the vehicle processor for subsequent actions. For example, image data from the cameras 14, 18, and 22 is sent to a processor, or vehicle controller 11, which processes the image data. In the case of external cameras, image data may be wirelessly transmitted to the vehicle controller 11 for use as described in any of the various examples of the present disclosure. As discussed in more detail below, the vehicle processor 11 may be programmed to generate images and other graphics at a user display such as, for example, a console screen or at a review mirror display device.

The various vision system components discussed herein may have one or more associated controllers to control and monitor operation. The vehicle controller 11, although schematically depicted as a single controller, may be implemented as one controller, or as system of controllers in cooperation to collectively manage the vision system and other vehicle subsystems. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 11 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 11 may also store a number of algorithms or computer executable instructions in non-transient memory that are needed to issue commands to perform actions according to the present disclosure. In some examples algorithms are provided from an external source such as a remote server 15.

The controller 11 is programmed to monitor and coordinate operation of the various vision system components. The controller 11 is in communication with each of the image capturing devices to receive images representing the vicinity and may store the images as necessary to execute vehicle security enhancement algorithms described in more detail below. The controller 11 is also in communication with a user display in an interior portion of the vehicle 10. The controller is programmed to selectively provide pertinent images to the display to inform passengers about conditions in the vicinity of the vehicle 10. While image capturing devices are described by way of example in reference to the vision system, it should be appreciated that the controller 11 may also be in communication with an array of various sensors to detect external objects and the overall environment of the vehicle. For example, the controller may receive signals from any combination of radar sensors, lidar sensors, infrared sensors, ultrasonic sensors, or other similar types of sensors in conjunction with receiving image data. The collection of data signals output from the various sensors may be fused to generate a more comprehensive perception of the vehicle environment, including detection and tracking of external objects.

The controller 11 may also be capable of wireless communication using an internal transceiver. The transceiver may be configured to exchange signals with a number of off-board components or systems. The controller 11 is programmed to exchange information using a wireless communications network 13. Data may be exchanged with a remote server 15 which may be used to reduce on-board data processing and data storage requirements. In at least one example, the server 15 performs processing related to image processing and analysis. The server may store one or more model-based computation algorithms to perform vehicle security enhancement functions. The controller 11 may further be in communication with a cellular network 17 or satellite to obtain a global positioning system (GPS) location. The controller may further receive data from a weather service concerning present weather conditions and weather forecasts. The controller 11 may also be in direct wireless communication with objects in a vicinity of the vehicle 10. For example, the controller may exchange signals with various external infrastructure devices (i.e., vehicle-to-infrastructure, or V2I communications) and/or a nearby vehicle 19 to provide data acquired from the vision system 12, or receive supplemental image data to further inform the user about the vehicle environment.

The vision system 12 may be used for recognition of road markings, lane markings, road signs, or other roadway objects for inputs to lane departure warning systems and/or clear path detection systems. Identification of road conditions and nearby objects may be provided to the vehicle processor to guide autonomous vehicle guidance. Images captured by the vision system 12 may also be used to distinguish between a daytime lighting condition and a nighttime lighting condition. Identification of the daylight condition may be used in vehicle applications which actuate or switch operating modes based on the sensed lighting condition. As a result, the determination of the lighting condition eliminates the requirement of a dedicated light sensing device while utilizing existing vehicle equipment. In one example, the vehicle processor utilizes at least one captured scene from the vision system 12 for detecting lighting conditions of the captured scene, which is then used to adjust a dimming function of one or more image displays such as at a rearview mirror or other external view displays. In addition to the above-describe functions of the vision system, aspects of the present disclosure include parking enhancement to improve accuracy of vehicle positioning within a known parking location.

According to aspects of the present disclosure, images captured by the vision system 12 are used to enhance vehicle arrival to and/or departure from a known location. In some examples, portions of a security enhancement algorithm conditionally render one or more external camera views to the driver via a user display. In a more specific example, the security enhancement algorithm may be used in combination with camera image pattern storing and comparison to provide advanced warnings and other actions in response to detection of one or more threats.

The vehicle controller 11 may be programmed to facilitate thermal management of the interior cabin using data acquired by the vision system 12. Some examples include monitoring the external environment for heat sources and actively controlling venting of the passenger cabin to manage the interior temperature of the vehicle. In other examples, data acquired by the vision system is used to enhance the weather data. More specifically, the controller may include algorithms which detect the presence, magnitude, and behavior of local wind by analyzing the movement of external objects. The images captured by the vison system commonly include objects that have movement patterns affected by wind. Trees, bushes, flags, blowing leaves, and other such wind-affected objects carry distinct and recognizable movement patterns when blowing in the wind. In this way, the vehicle may recognize the presence of local gusts or patterns of wind that are local to the vehicle and which may not be reflected in a broadcast weather report. The controller 11 may be further programmed to adjust direction and speed of broadcast wind information based on the frequency and intensity of the movement of wind-affected items within the local FOV of the vehicle. Then, the controller 11 can use the adjusted direction and/or magnitude of the local wind as enhanced by the vision system to optimize the articulation of openings for thermal management.

The controller 11 may further be in communication with any of a number of powered openings which are articulable across a range of open positions to allow fluid flow communication between the compartment and an exterior of the vehicle. Discussed in detail below, the controller may selectively actuate the openings based on both thermal management and vehicle security. The articulable openings may include at least one of power sliding windows, sunroofs, tilting vent windows, or powered closure panels such as liftgates or sliding doors. Any combination of the openings may be actuated to enhance airflow to regulate the temperature of an interior compartment.

Figure 2:
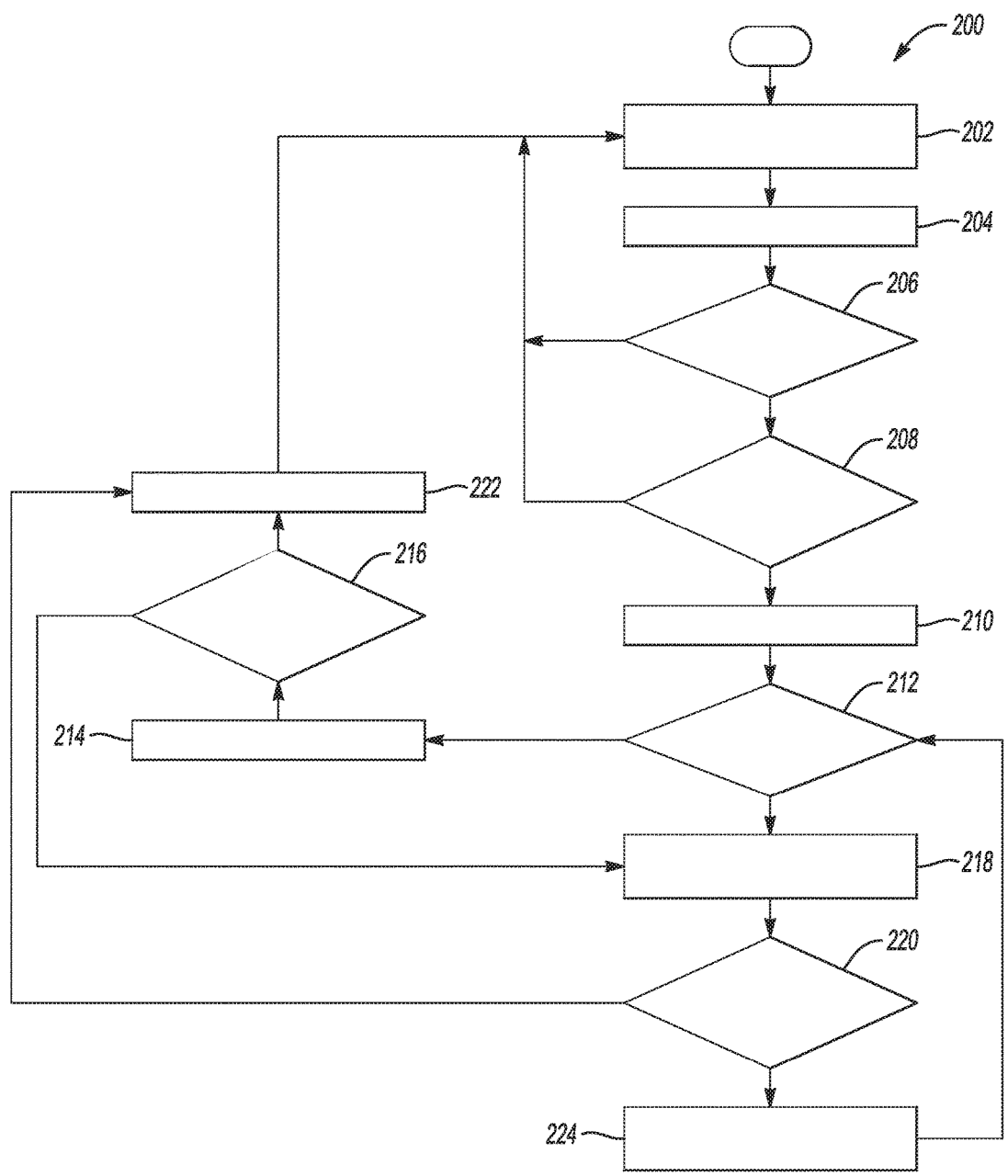
FIG. 2 is a flowchart of a vehicle compartment thermal management algorithm.

Referring to FIG. 2, flowchart 200 depicts an algorithm configured to manage passenger cabin temperature while monitoring the vehicle vicinity using data from the vision system. At step 202 the algorithm includes measuring the passenger cabin temperature T1. The vehicle may include one or more temperature sensors disposed about the passenger cabin to provide data signals indicative of the interior temperature. The vehicle controller may use these data to calculate an overall average passenger cabin temperature value. Alternatively, the controller may independently monitor the temperature of various areas of the passenger cabin and cause responses based on the thermal behavior of individual zones. The temperature of any of several vehicle compartments may be automatically managed using data provided by the vision system. For example, the temperature of a cargo stowage area of the vehicle may be regulated separately from other portions of the passenger cabin when temperature-sensitive cargo is being stowed. In this way, an articulable opening near the cargo area may be actuated to more closely influence the local temperature in a zone including the cargo stowage area.

At step 204 the algorithm includes receiving data indicative of external weather conditions near the vehicle. Such data may be obtained from any number of sources. According to some examples, the vehicle includes rain sensors near a windshield portion which are configured to detect the presence of rain droplets upon the windshield. In other examples, the vehicle includes an external temperature sensor configured to provide data signals indicative of the temperature in the vicinity of the vehicle. In further examples, a weather report including at least one of precipitation information, ambient temperature information, and wind information is received from an off-board weather reporting source.

At step 206 the algorithm includes comparing the internal passenger cabin temperature T1 to a predetermined temperature threshold. If the temperature T1 is equal to or less than the temperature threshold at step 206, the algorithm may return to step 202 and continue to monitor the internal passenger cabin temperature.

If at step 206 the passenger cabin temperature T1 is greater than the temperature threshold, the algorithm includes assessing the amount of time before a passenger is expected to arrive at the vehicle. In some cases, this determination is made from usage pattern data such as an average daily departure time from the driver's workplace. In other examples, a predetermined schedule is provided, such as the case of an autonomous vehicle, such that the vehicle controller receives schedule data from a user device indicating the time of upcoming passenger encounters. Based on the amount of time prior to passenger arrival, the algorithm includes managing the passenger cabin temperature to a more comfortable level by the time the passenger enters the vehicle. In further examples, the vehicle controller may estimate the time required to cool the vehicle to the temperature threshold from the current temperature T1. Larger deviations between the current temperature and the desired threshold may require more cooling time. Also, higher ambient temperatures, or lower wind speeds may also increase the time required to cool the passenger cabin to the desired temperature threshold. Therefore the algorithm may be configured to dynamically determine the time threshold based on at least one of the passenger cabin temperature T1, the external temperature, sunload, and external wind speed. As used in the present disclosure, sunload means heat intensity and/or light intensity produced by the sun as received at the vehicle. The direction of the sunload may be used as an input to determine which of the openings need to be actuated. If at step 208, the passenger arrival time is equal to or greater than a time threshold, there may be no need to actively vent the vehicle at such an early time. Thus the algorithm includes returning to step 202 to monitor the passenger cabin temperature.

The time threshold may be based on the duration required to cool the passenger cabin from the current temperature T1 to a desired temperature threshold. That is, the time threshold may be based on a difference between the current passenger cabin temperature and the temperature threshold. In other examples, a predetermined fixed time threshold may be set (e.g., ten minutes prior to passenger arrival) to achieve as much cooling as possible prior to passenger arrival.

If at step 208 the passenger arrival time is less than the time threshold the algorithm includes preparing for an automatic vehicle cooling mode by verifying the vicinity of the vehicle is free from perceived threats. At step 210 sensor detection is enabled. This includes activation of at least the vision system as described above to detect the presence of objects nearby the vehicle.

At step 212 if an object is detected, the algorithm includes determining if the object is a threat which may affect whether or not to open a vehicle aperture for venting, and if so, by what magnitude to open the aperture. Discussed in more detail below, at step 214 the algorithm includes performing a threat assessment based on at least one of a plurality of sensor outputs, the type of detected objects, the behavior and intent of a detected object, the host vehicle location, time of day, external light levels, and user setting inputs.

According to aspects of the present disclosure, the vehicle controller may perform the threat assessment based on settings input by a user. As described above a passenger may wish to engage in a preferred distracting activity while sitting in the vehicle and not scrutinize objects in the vicinity. The passenger may then input a user setting to engage a diligence mode to allow the vehicle to effectively take watch of the surroundings. Diligence mode as used in the present disclosure may include algorithms which actively probe the vehicle vicinity for visible threats. Such an on-demand detection mode may allow a user to determine when the vehicle actively probes for security while the vehicle is stationary as opposed to vision applications configured to enhance driving. According to a specific example, during situations where a user feels subjectively uncomfortable, input from the user causes the vehicle to engage diligence mode to actively surveille the vicinity near the host vehicle to enhance user comfort. The vehicle user display may be used to provide additional FOV information to increase driver assurance with respect to the conditions of the vehicle surroundings.

According to some aspects, the vehicle may automatically enter the diligence mode based on the contextual situation of the vehicle. The degree of surveillance, subsequent data output, and vehicle response actions may all be progressively increased based on a risk score or threat assessment value which is calculated at the controller. That is, any of a range of vehicle responses and alerts may be provided based on the perceived urgency of the detected threat. There may be a set of progressive threat assessment score thresholds corresponding to increasing threat levels. The various different vehicle responses may be based on an assessment of the perceived object's status along a continuum of states indicating the threat status of the object.

In other examples, geographical location information may be used as a basis to vary the sensitivity of visual detection performed by the vision system when at high-risk geolocations. More specifically, the diligence mode algorithm may include a crime risk assessment value based on statistical crime data associated with a given geographic location. Thus in known high-crime locations, the vehicle may more actively surveille its surroundings as compared to lesser-crime areas. In further examples, there may be a lower threshold of a vehicle response to detection of objects near the vehicle while the crime risk assessment is larger. According to aspects of the present disclosure, the vehicle controller may be programmed to use location-based information as a basis to perform a threat assessment by increasing object detection sensitivity when the vehicle is at a high-risk geolocation.

In additional examples, the time of day may be incorporated into the determination of the threat assessment value. For example, nighttime hours may carry a greater likelihood of crime approaching the vehicle as compared to a threat assessment value calculated during daylight hours. According to aspects of the present disclosure, the vehicle controller may be programmed to use time of day as a basis to perform a threat assessment by increasing weighting of the threat assessment value during nighttime hours.

In further examples, light detection may be an additional input to the threat assessment algorithm. Specifically, data output from a light sensor may be used to apply weighting based on the light level in the area near the vehicle. In this case, where more dark areas are present near the vehicle, the diligence mode may be automatically engaged to monitor for threats emerging from the dark areas. In contrast, more well-lit areas (even at night time) may mitigate an increase in the threat assessment value for nighttime situations. As discussed above, the image capture devices themselves may be effectively used for light level detection by analyzing a light level of the image data acquired by the devices.

Once an external object is detected by the vision system, the particular movement of the object may be indicative of the degree of a potential threat. For example, the controller may be programmed to use speed of a moving external object as an input to the threat assessment algorithm. In addition, the particular trajectory of the object relative to the vehicle position, as well as the proximity of the moving external object each may be inputs to the threat assessment algorithm. As used herein, trajectory refers to a curve describing the path of movement of a moving object. A heading direction of given object may change along a trajectory path. In some cases a trajectory may be extrapolated to provide information regarding future motion of a given object. In a specific example, the controller is programmed to use each of speed, trajectory, and proximity of a moving external object to calculate a time of arrival at the vehicle. In this way, the controller may cause a proactive response action of the vehicle prior to the approaching object arriving at the vehicle. Similarly, external objects which carry a trajectory directed away from the vehicle may correspond to significantly higher time of arrival (e.g., infinite) and therefore pose little or no perceived threat.

Weighting applied during the threat assessment to any particular input may vary in a nonlinear fashion based on changes in the detected state. For example the threat assessment portion of the algorithm may include portions which nonlinearly increase sensitivity when external objects become closer to the vehicle. That is, the algorithm may be highly sensitive to speed and trajectory of movement when an object is within a first distance threshold from the vehicle. In contrast, similar speed and trajectory of movement may have little or no impact to the risk score at distances further away from the vehicle. That is, the algorithm may disregard certain degrees of speed and trajectory of movement when an object is outside of a second distance threshold from the vehicle.

According to further examples, the position of a detected object relative to the vehicle goes into determination of the threat assessment value. That is, objects that are detected at more obscure relative locations relative to a driver's personal FOV may receive a higher threat rating based on a lower likelihood that the driver becomes aware of the object. In contrast, objects directly in front of the vehicle may receive less threat weighting due to a higher likelihood that the driver becomes aware of such objects. According to aspects of the present disclosure, the controller is programmed to assign a greater threat weighting in response to detection of external objects that are rear of the vehicle or at oblique rear angles relative to a driver FOV.

The weighting applied to each of the different inputs may be varied relative to each other under certain scenarios. For example, proximity and/or object speed may be receive a higher priority relative to geographical information in some instances.

At step 216 the algorithm includes weighing the degree of the threat detected against one or more predetermined threat thresholds. At step 216 if the threat score is equal to or less than the threat threshold, the algorithm proceeds to aperture opening management portions of the algorithm.

At step 218 the algorithm includes determining the direction of a heat source (e.g., the sun) as an input to determine which apertures to open. The direction of the heat source may be determined by any of light sensors, sunload sensors, and/or optical detection using images captured by the vision system.

At step 220 the algorithm includes assessing weather data to determine whether conditions are suitable to increase one or more openings to increase airflow. For example precipitation data provided from an off-board weather service provider may indicate that rain in the area near the vehicle makes it undesirable to open windows. In another example, the algorithm assesses data output from an onboard rain sensor.

If the weather is not suitable for maintaining an open position of any of the vehicle windows or closure panels, the algorithm includes at step 222 closing any vented panels which were previously in an open position. The algorithm includes returning to step 202 to monitor the internal temperature of the passenger cabin and seek opportunities to suitably manage the temperature using data output from the vision system.

If at step 220 weather conditions are suitable to open one or more openings to increase ventilation, the algorithm includes optimizing cooling by selecting the particular openings that have the greatest effect on passenger cabin temperature. For example, depending on the sun direction lowering all windows allows a full solar impact upon vehicle seats, steering wheel, dash panel, and other interior components. Since the window glass partially blocks solar load, the heating of the interior components may actually increase passenger cabin interior temperature. Thus the algorithm may include at step 224 maintaining window positions near full up on a first sun-receiving side of the vehicle, and fully lowering windows on a second, opposite side of the vehicle. Additionally wind speed and direction may be received from the weather service or measured directly at the vehicle (e.g., using an anemometer). Step 224 may also include wind data to calculate a combination of different window opening magnitudes based on how wind will pressurize the interior to extract heat from the passenger cabin.

Once a combination of vehicle openings is selected, the algorithm includes returning to step 212 to monitor the vehicle surrounding for nearby objects. As discussed above, a diligence mode may include algorithms which actively probe the vehicle vicinity for visible threats. Diligence mode detection may utilize the vision system to actively probe for security threats or other approaching objects. If an object is detected, the algorithm includes performing a threat assessment of the detected object. Even if the threat score is less than the threat threshold, the position and movement of the object may be used as inputs to a determination at step 224 of which openings to actuate. For example, if a pedestrian is detected on a first side of the host vehicle at a distance away, windows on the first side may be adjusted to a minimal opening (e.g., about 1 inch). At the same time, windows on an opposing second side of the vehicle may be maintained at a full down position. This arrangement gives the ability to quickly close windows on the first side as the pedestrian gets closer, since the minimal opening position allows the first side windows to close quickly relative to a fully open position.

Figure 3:
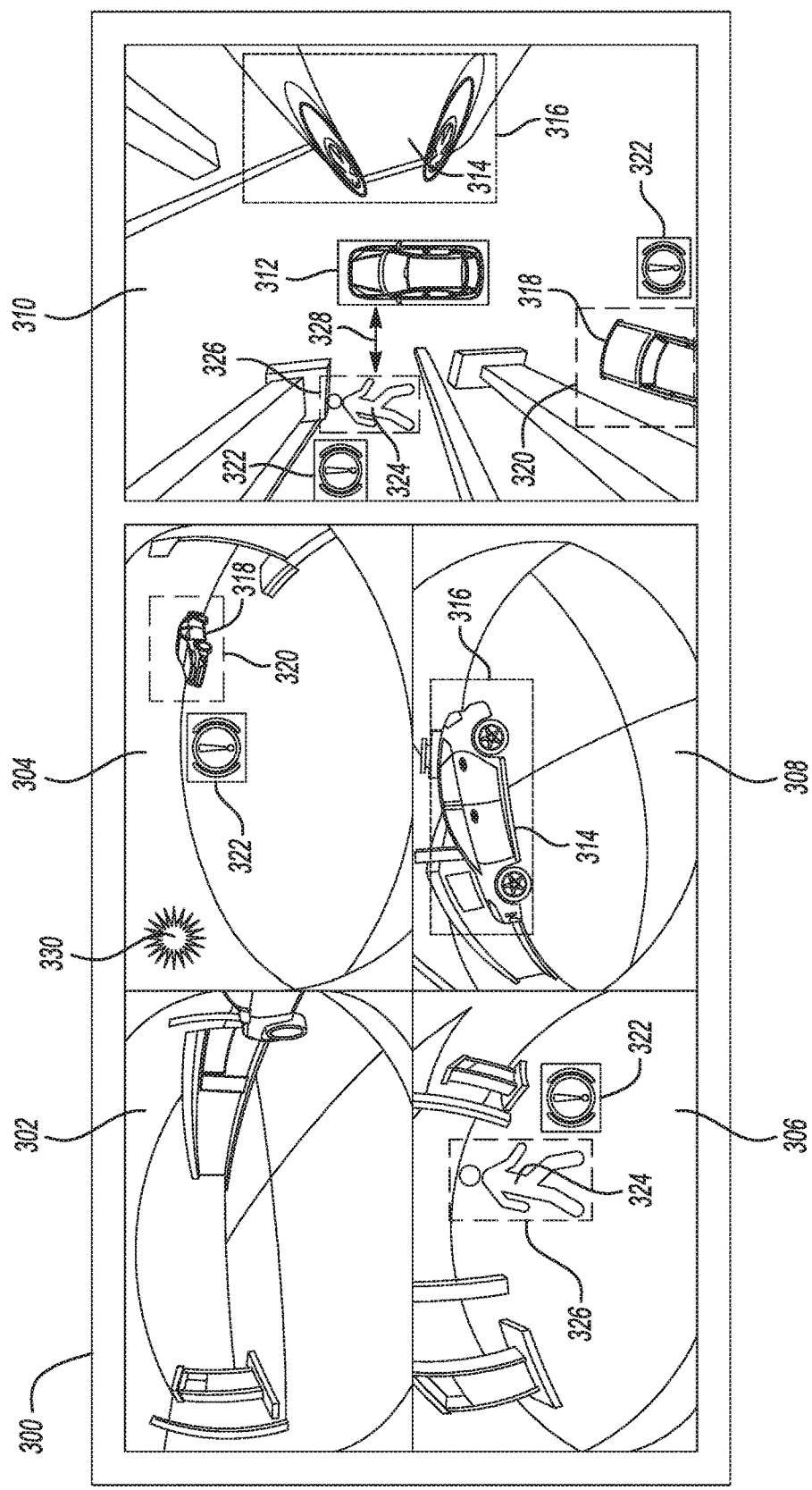
FIG. 3 is a schematic user display interface including vehicle vicinity surveillance images.

Referring to FIG. 3, an example user interface display 300 depicts several FOV images indicative of the vicinity of the vehicle. A display screen may be segmented into any number of views according to the relevant data to be presented to a user. Alternatively, the view may be segmented based on the number of available image sources. In some examples a single view is provided for simplicity having only a view depicting a detected external object. In the example of FIG. 3, five segments are provided according to four different FOV's from the vehicle at a parked location. View 302 corresponds to image data output from a front camera, view 304 corresponds to image data output from a rear camera, and views 306 and 308 correspond to image data output from left side and right side cameras, respectively. View 310 is a compiled view using data from other cameras to provide a "bird's eye" 360 degree top perspective of the vicinity in a single view. The host vehicle is schematically represented by a vehicle graphic 312.

External objects detected in one or more FOV's may be highlighted by graphical overlays to alert a user to the presence of a potential threat. With continued reference to FIG. 3, several objects are detected by a vehicle vision system and are represented on the graphic user interface 300. An external object, adjacent vehicle 314, is detected by at least one right side lateral sensor and appears in both of the right side view 308 and the top perspective view 310. According to an aspect of the present disclosure, the vehicle performs a threat assessment of the adjacent vehicle 314 based on one or more factors as discussed above. In the case of FIG. 3, the object is detected and graphically identified by an overlay of bounding box 316. The graphical overlay bounding box 316 may have visually distinguishing characteristics, such as color or shape for example, to identify it as a non-threatening external object. In one example, the host vehicle communicates an information request to the adjacent vehicle 314 as it enters the vicinity. The adjacent vehicle may respond with a message that it carries a predetermined navigation designation to the same location as the host vehicle. Such a predetermined destination, along with the absence of certain aggressive movements may reduce the threat assessment value assigned to the adjacent vehicle 314. In the example of adjacent vehicle 314 not presently being deemed a threat, the object would not preclude activating one or more openings on the right side of the host vehicle to manage the internal temperature of the passenger cabin. It should be appreciated that the system continuously or intermittently monitors the surrounds for changes in threat level associated with a particular detected object.

In a second example depicted in FIG. 3, a rear-approaching vehicle 318 is detected by at least one rear sensor and appears in both of the rear view 304 and the top perspective view 310. The vehicle performs a threat assessment of the rear-approaching vehicle 318 based on one or more factors as discussed above. A graphical overlay bounding box 320 is applied to each of the relevant views of the user interface display to identify the rear-approaching vehicle 318. In this case, the host vehicle identifies the rear-approaching vehicle 318 as a threat having a sufficiently large threat assessment value. One potential cause of an increased threat value is a closing velocity of the rear-approaching vehicle 318 which is greater than a closing velocity threshold. The bounding box 320 is visually distinctive relative to other graphics identifying non-threat external objects. Also, one or more warning icons 322 may be flashed on the user interface display 300 to alert one or more passengers of the rear-approaching vehicle 318. In the example of the rear-approaching vehicle 318 being currently deemed a threat, the surveillance algorithm may override cooling demand and close all openings prior to the arrival of the rear-approaching vehicle 318 at the host vehicle.

In a third example of FIG. 3, a heat source 330 (e.g. sun) is captured by the vision system. As discussed above, the location and intensity of the heat source may be used as an input to determine which openings to activate in response to an elevated passenger cabin temperature. The heat source 330 appears in the rear view 304 and is biased towards a passenger side of the host vehicle 312. Thus the algorithm may maintain passenger side windows in a majority raised position to reduce sunload upon the interior and fully open the opposing driver side windows.

In a fourth example depicted in FIG. 3, an external object pedestrian 324 enters the vicinity of the host vehicle. The pedestrian 324 is detected by at least one left side lateral sensor and appears in both of the left side view 306 and the top perspective view 310. A graphical overlay bounding box 326 is applied to each of the relevant views of the user interface display to identify the pedestrian 324 as a threat. A number of factors may influence the threat assessment value based on the vehicle environment. For example the surveillance algorithm may consider at least one of: being located at a commerce location, the pedestrian 324 approaching from the driver's side of the vehicle, and the pedestrian being at a close proximity distance 328 from the host vehicle. As discussed above, the sensitivity of the threat assessment algorithm may be increased when external objects are detected within a threshold distance from the host vehicle. In this way the vehicle may be more responsive to more subtle behaviors of external objects when they are close by. Similar to the second example immediately above, one or more warning icons 322 may be flashed on the user interface display 300 to alert one or more passengers of the pedestrian 324.

In the example of the pedestrian 324 being currently deemed a threat, the surveillance algorithm may override cooling functions and respond based on the distance 328 between the pedestrian 324 and the host vehicle 312. More specifically, the windows on the driver side of the vehicle may be raised to a minimal opening while the distance 328 is greater than a distance threshold. In this way, the closing time of the windows is reduced, allowing window actuators to quickly respond if the pedestrian converges on the host vehicle. When the distance 328 is reduced to below the distance threshold, the surveillance algorithm may cause a full closure of at least the driver side windows. It should be appreciated that when a driver approaches the host vehicle having identifying credentials (e.g., a key fob), the surveillance algorithm may be configured to disregard any threats associated with the driver regardless of the driver's movement characteristics.

As discussed above, further alternative embodiments allow a user to manually engage temperature management mode while the diligence mode is active and the user is present in the vehicle. For example a user may wish to remain in the vehicle on a hot day while focusing their attention on a particular distraction. For example user activities such as taking a nap, doing work, or reading a book may prevent the user from devoting full attention to the vehicle surroundings. Once the temperature management mode is engaged, a vehicle controller may automatically control the location and degree of opening of any of a number of vehicle openings. For example, any combination of power sliding windows, sunroofs, tilting vent windows, or powered closure panels such as liftgates or sliding doors may be actuated to allow airflow to regulate the temperature of the passenger cabin. At the same time, diligence mode features may be engaged as discussed above to monitor the surroundings of the vehicle for possible approaching threats and allow the user to comfortably devote their attention on any of number of preferable distractions.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a plurality of detectors each configured to output a respective signal, the plurality of detectors including a vision-based imaging device and a light sensor;
   wherein the vision-based imaging device is configured to output the respective signal indicative of exterior conditions in a vicinity of the vehicle;
   wherein the light sensor is configured to output the respective signal indicative of a light level in the vicinity of the vehicle;

a plurality of articulable openings arranged to allow fluid flow communication between an interior and an exterior of the vehicle;

and a controller in communication with the plurality of detectors and programmed with a diligence mode engageable on demand by an operator of the vehicle;

wherein the diligence mode is automatically engaged by the controller when the respective signal from the light sensor is below a predefined threshold;

wherein the controller is programmed to, when the diligence mode is engaged:

detect an object in the vicinity of the vehicle via the vision-based imaging device;

determine a threat assessment score for the object based on at least one weighting factor, the at least one weighting factor being increased when the object is in a rear of the vehicle or at an oblique rear angle relative to a field of view of the operator;

determine a proximity of the object from the vehicle;

when the object is determined to be within a first distance threshold from the vehicle, obtain a speed of the object and a trajectory of movement the object, based in part on the vision-based imaging device;

when the object is determined to be within the first distance threshold from the vehicle, employ the speed, the trajectory and the proximity of the object from the vehicle to calculate a time of arrival at the vehicle, via the controller;

and adjust at least one of the plurality of articulable openings toward a closed position in response to the threat assessment score being greater than a threat threshold and based in part on the time of arrival of the object at the vehicle.

2. The vehicle of claim 1 wherein the controller is further programmed to receive a weather forecast signal and the threat assessment score is based in part on a precipitation condition.

3. The vehicle of claim 1 wherein the controller is further programmed to select a location to adjust at least one of the plurality of articulable openings toward an open position based on a sunload detection.

4. The vehicle of claim 1, wherein the controller is further programmed to select at least one of: a quantity of the plurality of articulable openings to adjust toward an open position and a magnitude of the one open position based on the threat assessment score.

5. The vehicle of claim 1 wherein the controller is further programmed to receive a signal from a user device indicative of a schedule and initiate a cooling mode at a predetermined time prior to a scheduled user arrival at the vehicle.

6. The vehicle of claim 1 wherein the controller is further programmed to determine an expected arrival time of a user at the vehicle based on usage patterns, and initiate a cooling mode at a predetermined time prior to the expected arrival time.

7. The vehicle of claim 1, wherein the controller is programmed to:

send a given geographic location of the vehicle to a remote server, via a wireless communications network;

receive statistical crime data associated with the given geographic location from the remote server, via the wireless communications network; and increase the at least one weighting factor based at least partially on the statistical crime data.

8. The vehicle of claim 1, wherein:

the vehicle includes a user interface display and the controller is programmed to alert the operator in response to the threat assessment score being greater than a threat threshold, via a message on the user interface display.

9. The vehicle of claim 1, wherein:

the controller is programmed to override a cooling demand and fully close the at least one articulable opening prior to the time of arrival of the object at the vehicle.

10. A method of controlling a vehicle having at least one articulable opening, a plurality of detectors each configured to output a respective signal, and a controller in communication with the plurality of detectors, the plurality of detectors including a vision-based imaging device and a light sensor, the method comprising:

configuring the vision-based imaging device to output the respective signal indicative of exterior conditions in a vicinity of the vehicle;

configuring the light sensor to output the respective signal indicative of a light level in the vicinity of the vehicle;

configuring the at least one articulable opening to allow fluid flow communication between an interior and an exterior of the vehicle;

programming the controller with a diligence mode engageable on demand by an operator of the vehicle;

configuring the diligence mode to be automatically engaged by the controller when the respective signal from the light sensor is below a predefined threshold;

detecting an object in the vicinity of the vehicle via the vision-based imaging device;

when the diligence mode is engaged, determining a threat assessment score for the object based on at least one weighting factor, via the controller;

wherein the at least one weighting factor is increased when the object is in a rear of the vehicle or at an oblique rear angle relative to a field of view of the operator;

determining a proximity of the object from the vehicle;

when the object is determined to be within a first distance threshold from the vehicle, obtaining a speed of the object and a trajectory of movement the object, based in part on the vision-based imaging device;

when the object is determined to be within the first distance threshold from the vehicle, employing the speed, the trajectory and the proximity of the object from the vehicle to calculate a time of arrival at the vehicle, via the controller;

and adjusting the at least one articulable opening toward a closed position in response to the threat assessment score being greater than a threat threshold and based in part on the time of arrival of the object at the vehicle.

11. The method of claim 10, wherein the plurality of detectors includes a temperature sensor, the method further comprising:

measuring a current passenger cabin temperature, via the temperature sensor;

adjusting the at least one articulable opening toward an open position in response to the passenger cabin temperature exceeding a temperature threshold, at a predetermined time prior to an expected passenger arrival time at the vehicle.

12. The method of claim 11, wherein the predetermined time is based on a difference between the current passenger cabin temperature and the temperature threshold.

13. The method of claim 11, further comprising:

selecting a location to adjust the at least one articulable opening toward the open position based on a sunload detection.

14. The method of claim 10, wherein the controller is capable of communicating with a wireless communications network, the method further comprising:
- sending a given geographic location of the vehicle to a remote server, via the wireless communications network;
- receiving statistical crime data associated with the given geographic location from the remote server, via the wireless communications network; and
- increasing the at least one weighting factor based at least partially on the statistical crime data, via the controller.

15. The method of claim 10, wherein the vehicle includes a user interface display, the method further comprising:
- programming the controller to alert the operator in response to the threat assessment score being greater than the threat threshold, via a message on the user interface display.

16. The method of claim 10, further comprising:
- programming the controller to override a cooling demand and fully close the at least one articulable opening prior to the time of arrival of the object at the vehicle.

* * * * *